US012795701B2

(12) United States Patent
Yang

(10) Patent No.: US 12,795,701 B2
(45) Date of Patent: Nov. 10, 2026

(54) COMMUNICATION CONFIGURATION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 247 days.

(21) Appl. No.: 18/294,723

(22) PCT Filed: Aug. 4, 2021

(86) PCT No.: PCT/CN2021/110470

§ 371 (c)(1),
(2) Date: Feb. 2, 2024

(87) PCT Pub. No.: WO2023/010316

PCT Pub. Date: Feb. 9, 2023

(65) Prior Publication Data

US 2024/0357624 A1 Oct. 24, 2024

(51) Int. Cl.
*H04W 72/40* (2023.01)
*H04W 76/28* (2018.01)

(52) U.S. Cl.
CPC ........... *H04W 72/40* (2023.01); *H04W 76/28* (2018.02)

(58) Field of Classification Search
None
See application file for complete search history.

(56) References Cited

U.S. PATENT DOCUMENTS

2021/0059004 A1* 2/2021 Wu ..................... H04W 72/569
2023/0014303 A1* 1/2023 Di Girolamo ........ H04W 76/28
2023/0156858 A1* 5/2023 Freda ................ H04W 52/0219
370/329

FOREIGN PATENT DOCUMENTS

WO WO 2021119474 A1 6/2021

OTHER PUBLICATIONS

International Search Report and Written Opinion of International Application No. PCT/CN2021/110470, dated Apr. 26, 2022, 15 pages.
"Discussion on DRX configuration and DRX timers", Oppo, 3GPP TSG-RAN WG2 #114-e, R2-2104835, E-meeting, May 2021, 17 pages.
"Consideration on the sidelink DRX for unicast, groupcast and broadcast", Huawei, HiSilicon, 3GPP TSG-RAN WG2 Meeting #112 electronic, R2-2009413, Nov. 2-13, 2020, 8 pages.
Extended European Search Report Issued in Application No. 21952218.2 dated Feb. 24, 2025, 10 pages.

* cited by examiner

*Primary Examiner* — Diane L Lo
(74) *Attorney, Agent, or Firm* — Finnegan, Henderson, Farabow, Garrett & Dunner, L.L.P.

(57) ABSTRACT

A communication configuration method is performed by a first User Equipment (UE), and includes: determining that at least a part of sidelink (SL) configurations provided by a second UE are unusable, and sending indication information to the second UE through the SL, wherein the indication information at least indicates: one or more sets of SL configurations not used by the first UE or one or more sets of SL configurations used by the first UE.

19 Claims, 6 Drawing Sheets

COMMUNICATION CONFIGURATION METHOD AND APPARATUS, COMMUNICATION DEVICE, AND STORAGE MEDIUM

CROSS-REFERENCE TO RELATED APPLICATION

This application is a US national phase of International Application No. PCT/CN2021/110470, filed on Aug. 4, 2021, the content of which is hereby incorporated by reference in its entirety.

TECHNICAL FIELD

The disclosure relates to, but is not limited to, a field of communication technologies, in particular to a communication configuration method, a communication configuration apparatus, a communication device, and a storage medium.

BACKGROUND

In order to support direct communication between User Equipment (UEs), a Sidelink (SL) communication method is introduced. In the SL communication method, a communication interface between a sender UE and a receiver UE is a PC-5.

In the related art, the sender UE may directly or indirectly provide configurations to the receiver UE, so that the receiver UE may communicate based on the configurations provided by the sender UE. When the receiver UE may use all configurations provided by the sender UE, it will respond to the sender UE by sending a message for indication that the configurations take effect.

SUMMARY

According to a first aspect of embodiments of the disclosure, a communication configuration method, performed by a first user equipment (UE), is provided. The method includes:

determining that at least a part of sidelink (SL) configurations provided by a second UE are unusable and sending indication information to the second UE through a SL, in which the indication information at least indicates: one or more sets of SL configurations not used by the first UE or one or more sets of SL configurations used by the first UE.

According to a second aspect of embodiments of the disclosure, a communication configuration method, performed by a second user equipment (UE), is provided. The method includes:

receiving indication information sent by a first UE through a SL, in which the indication information at least indicates: one or more sets of SL configurations not used by the first UE or one or more sets of SL configurations used by the first UE.

According to a third aspect of embodiments of the disclosure, a communication device is provided. The communication device includes:

a processor; and a memory for storing instructions executable by the processor; in which, when the executable instructions are executed by the processor, the processor is configured to determine that at least a part of sidelink (SL) configurations provided by a second UE are unusable and send indication information to the second UE through a SL, in which the indication information at least indicates: one or more sets of SL configurations not used by the first UE or one or more sets of SL configurations used by the first UE.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit embodiments of the disclosure. The singular forms of "a" and "the" used in the disclosure and appended claims are also intended to include plural forms, unless the context clearly indicates other meanings. It is understandable that the term "and/or" as used herein refers to and includes any or all possible combinations of one or more associated listed items.

It is understandable that although the terms "first", "second", and "third" may be used in embodiments of the disclosure to describe various information, the information should not be limited to these terms. These terms are only used to distinguish the same type of information from each other. For example, without departing from the scope of embodiments of the disclosure, the first information may also be referred to as the second information, and similarly, the second information may also be referred to as the first information. Depending on the context, the term "if" as used herein can be interpreted as "when", "while" or "in response to determining".

Figure 1:
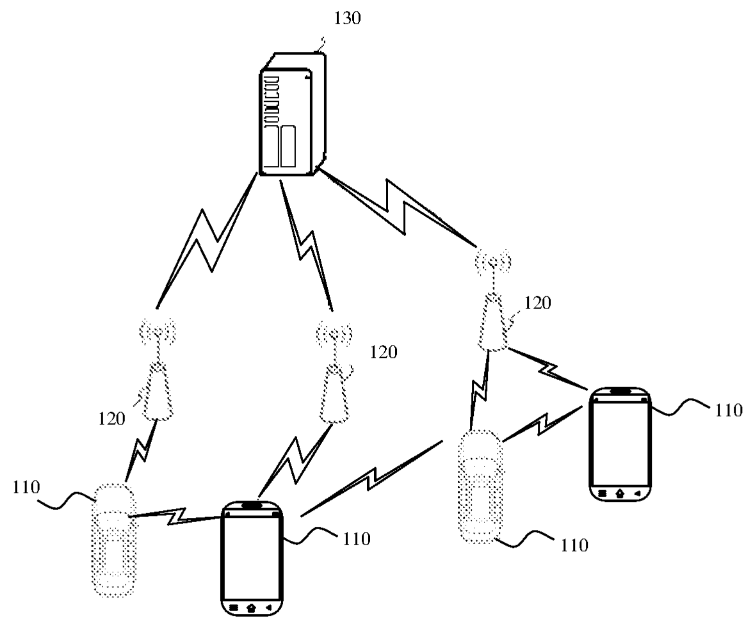
FIG. 1 is a schematic diagram illustrating a wireless communication system according to an embodiment.

FIG. 1 is a schematic diagram illustrating a wireless communication system according to an embodiment of the disclosure. As illustrated in FIG. 1, the wireless communication system is a communication system based on cellular mobile communication technology. The wireless communication system may include: a plurality of user equipment (UEs) 110 and a plurality of base stations 120.

The UE 110 may be a device that provides voice and/or data connectivity to a user. The UE 110 may communicate with one or more core networks via a Radio Access Network (RAN). The UE 110 may be an Internet of Things (IoT) UE, such as a sensor device, a cell phone (or "cellular" phone), and a computer having the IoT UE. Or, the UE 110 may be a stationary, a portable, a pocket-sized, a handheld, a computer-built, or a vehicle-mounted device, such as a Station (STA), a subscriber unit, a subscriber station, a mobile station, a mobile, a remote station, an access point, a remote terminal, an access terminal, a user terminal, a user agent, a user device, or a UE. Or, the UE 110 may be an unmanned aerial vehicle device. Or, the UE 110 may be an in-vehicle device, for example, an electronic control unit (ECU) having wireless communication functions, or a wireless UE external to the ECU. Or, the UE 110 can also be a roadside device, for example, a street light, a signal light, or other roadside devices having wireless communication functions.

The base station 120 may be a network side device in the wireless communication system. The wireless communication system may be the 4th Generation (4G) mobile communication system, also known as Long Term Evolution (LTE) system. Or, the wireless communication system may also be a 5G system, also known as New Radio (NR) system or 5G NR system. Or, the wireless communication system may be any next generation system of the 5G system. The access network in the 5G system may be called New Generation-RAN (NG-RAN).

The base station 120 can be an evolved base station (eNB) employed in the 4G system. Or, the base station 120 may be a base station (gNB) with a centralized-distributed architecture employed in the 5G system. When the base station 120 adopts a centralized-distributed architecture, it usually includes a Central Unit (CU) and at least two Distributed Units (DUs). The CU is equipped with the protocol stack of Packet Data Convergence Protocol (PDCP) layer, Radio Link Control (RLC) layer, or Media Access Control (MAC) layer. The DU is equipped with the protocol stack of the physical (PHY) layer, and the specific implementation of the base station 120 is not limited in embodiment of the disclosure.

A wireless connection may be established between the base station 120 and the UE 110 via a radio interface. In different implementations, the radio interface is a radio interface based on the 4G standard. Or, the radio interface is a radio interface based on the 5G standard, such as a NR. Or, the radio interface may also be a radio interface based on the standard of the next generation of 5G.

In some embodiments, End to End (E2E) connections may also be established between the UEs 110 in scenarios, such as, Vehicle to Vehicle (V2V) communication, Vehicle to Infrastructure (V2I) communication, and Vehicle to Pedestrian (V2P) communication in Vehicle to Everything (V2X) communication.

In some embodiments, the above wireless communication system may also include a network management device 130.

The plurality of base stations 120 each is connected to the network management device 130. The network management device 130 may be a core network device in the wireless communication system, for example, a Mobility Management Entity (MME) in an Evolved Packet Core (EPC). Or, the network management device may be another core network device, such as a Serving GateWay (SGW), a Public Data Network GateWay (PGW), a Policy and Charging Rules Function (PCRF), or a Home Subscriber Server (HSS), etc. The implementation form of the network management device 130 is not limited in embodiments of the disclosure.

In order to facilitate understanding by those skilled in the art, embodiments of the disclosure illustrate a plurality of implementations to provide a clear description of the technical solutions of embodiments of the disclosure. Certainly, those skilled in the art may understand that embodiments of the disclosure may be performed individually or together with the methods of other embodiments of the disclosure, or may be performed individually or together with the methods of other embodiments of the disclosure before being performed together with some methods in the related art, which is not limited in embodiments of the disclosure.

In order to better understand the technical solutions disclosed in embodiments of the disclosure, the SL configuration of the UE will be provided below.

SL technology is a near-field communication technology in which UEs communicate directly with each other through their radio interfaces. Sometimes, SL may be called as a side link or a secondary link. During the SL communication, the communication interface between the sender UE and the receiver UE is a PC-5. The SL supports three types of transmission methods, i.e., unicast, multicast, and broadcast. It is understandable that if a point-to-point connection is established between the sender UE and the receiver UE, the communication between the sender UE and the receiver UE over the SL is carried out using unicast transmission. It is understandable that in the unicast connection, each receiver UE corresponds to a destination identifier (ID). If the receiver UE accesses to a multicast address provided by the sender UE, the sender UE and the receiver UE communicate with each other on the SL using multicast transmission. It is understandable that in a multicast connection, each receiver UE may belong to one or more groups, and each group corresponds to a respective destination identifier (ID). If the receiver UE accesses to a broadcast address provided by the sender UE, the communication between the sender UE and the receiver UE is carried out by means of broadcast transmission on the SL. It will be appreciated that in a broadcast connection, each receiver UE corresponds to at least one destination ID.

The sender UE of the SL may configure communication configurations on the SL for the receiver UE of the SL based on network configurations or service characteristics, so that the receiver UE may communicate in the network based on the communication configurations. This communication configurations are the "SL configurations" described in embodiments of the disclosure. In some embodiments, the sender UE may directly or indirectly provide configurations to the receiver UE, so that the receiver UE may communicate based on the configurations provided by the sender UE. When the receiver UE may use all configurations provided by the sender UE, it will respond to the sender UE by sending a message for indication that the configurations take effect. However, when the receiver UE cannot use some of the configurations, it will reply a configuration failure message to the sender UE. This current configuring method is unconducive to the configuration efficiency of the receiver UE.

In some embodiments, the sender UE may send SL control information on a Physical Sidelink Control Channel (PSCCH). The SL control information may carry the SL configurations for the receiver UE.

It is noteworthy that Radio Resource Control (RRC) handles third layer information between the UE and a Radio Access Network (RAN) control plane. The RRC is mainly used for establishing a signaling link between the UE and the RAN, to allocate and manage radio resources. In order to communicate with the RAN, the UE firstly needs to establish a RRC link and then transmits a non-access stratum signaling. Currently, there are two ways to release the RRC connection. One way is that the network sends a RRC connection release message, and the terminal may release the RRC connection after receiving the message. The other way is that the base station configures an inactivity timer for the UE, and when the inactivity timer is expired, the UE automatically releases the RRC connection. Within a configured duration of the inactivity timer, if the inactivity timer is not triggered to restart, then the inactivity timer expires. That is, if no data or control signaling is sent within a period of time, the UE automatically releases the RRC connection.

Figure 2:
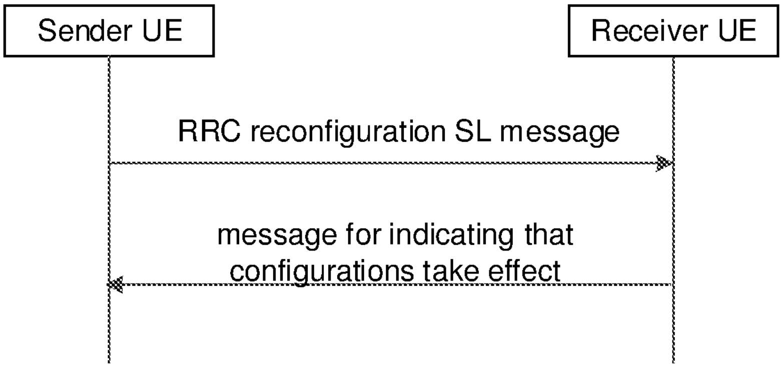
FIG. 2 is a schematic diagram illustrating wireless communication between user equipment (UEs) according to an embodiment.
Figure 3:
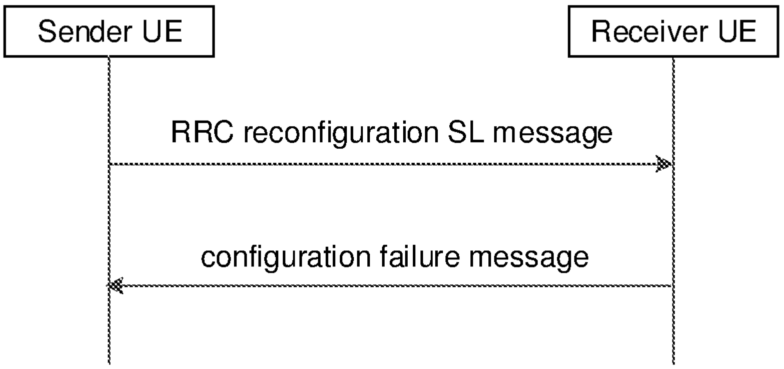
FIG. 3 is a schematic diagram illustrating wireless communication between user equipment (UEs) according to an embodiment.

As illustrated in FIGS. 2 and 3, the sender UE sends a reconfiguration SL message to the receiver UE, and the reconfiguration SL message carries SL configuration(s) for the receiver UE. In some possible implementations, the reconfiguration SL message may be an RRCReconfigurationSidelink message, which carries the SL configuration(s) for the receiver UE. The following uses the RRCReconfigurationSidelink message as an example for explanation. Certainly, the reconfiguration SL message can be another message, which will not be described again here. In the related art, after receiving the RRC reconfiguration SL message, the receiver UE sends a message for indicating that configurations take effect (e.g., an RRCReconfigurationCompleteSidelink message) to the sender UE when the receiver UE is able to use the SL configuration(s) carried in the RRCReconfigurationSidelink message, and stops the inactivity timer. When the receiver UE cannot use the SL configuration(s) carried in the RRCReconfigurationSidelink message, the receiver UE sends a UE configuration failure message (e.g., RRCReconfigurationFailureSidelink message) to the sender UE, and stops the inactivity timer.

That is, in the related art, the receiver UE may only reply with "configurations take effect" or "configuration failure" for the SL configuration(s) provided by the sender UE. When the receiver UE replies to the sender UE with the "configuration failure", the sender UE is unable to know exactly which SL configuration(s) has/have led to the configuration failure, and thus the sender UE is unable to quickly provide the receiver UE with SL configuration(s) that can be used, thereby affecting the configuration efficiency for the receiver UE.

Figure 4:
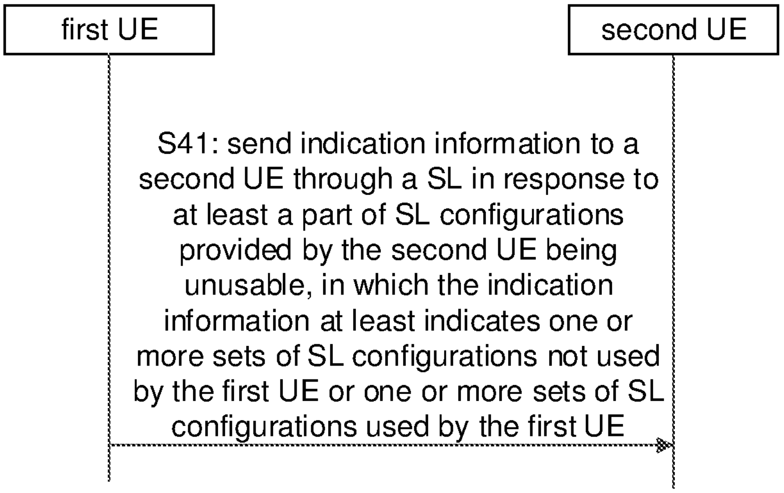
FIG. 4 is a flowchart illustrating a communication configuration method according to an embodiment.

In view of this, as illustrated in FIG. 4, embodiments of the disclosure provide a communication configuration method, which is performed by a first UE. The method includes the following.

At block S41, indication information is sent to the second UE through a SL in response to at least a part of SL configurations provided by a second UE being unusable, in which the indication information at least indicates: one or more sets of SL configurations not used by the first UE or one or more sets of SL configurations used by the first UE.

The "UE" herein may be various kinds of mobile terminals or fixed terminals. For example, the "UE" may be, but is not limited to, a cell phone, a computer, a server, a wearable device, a game control platform, or a multimedia device.

The "first UE" herein may be a receiver UE for receiving the SL configurations. The "second UE" herein may be a sender UE for providing the SL configurations as described above.

After establishing a connection (e.g., a unicast connection) between the first UE and the second UE, the second UE may provide communication configuration(s) to the first UE, so that the first UE can communicate based on the communication configuration(s).

In some embodiments, the SL configurations provided by the second UE to the first UE are those sent by the base station of the second UE to the second UE and then sent to the first UE by the second UE.

In other embodiments, the second UE may provide its own SL configurations to the first UE, such that the second UE may communicate with the first UE based on the same SL configurations. Certainly, in other embodiments, providing the SL configurations by the second UE to the first UE may be providing the SL configurations to the first UE based on a request from the first UE to the second UE.

Cases in which a SL configuration is not used by the first UE include at least one of the following cases that:

- a SL configuration received by the first UE conflicts with SL configuration(s) currently used by the first UE or conflict with a configuration other than the SL configuration(s);
- an error occurs on a SL configuration received by the first UE;
- the first UE rejects a received SL configuration; or
- a base station of the first UE rejects a received configuration.

The case that the SL configuration received by the first UE conflict with the SL configuration(s) currently used by the first UE means that SL resources indicated by the SL configuration received by the first UE do not match SL resources indicated by the SL configuration(s) currently used by the first UE, or do not match resources indicated by a configuration other than the SL configuration(s) currently used by the first UE. For example, a link configuration in SL configurations received by the first UE does not match usable links indicated by the SL configuration(s) currently used by the first UE, or does not match usable links indicated by the configurations other than the SL configuration(s) currently used by the first UE. As an instance, the link configuration in the SL configurations received by the first UE indicates link A. However, the SL configuration(s) currently used by the first UE or the configuration other than the SL configuration(s) indicate that the link A is unable to be used for communication, in other words, the usable links indicated by current communication configuration(s) of the first UE do not include the link A. As a result, the SL configuration received by the first UE conflicts with the communication configuration(s) currently used by the first UE.

The case that an error occurs on a SL configuration received by the first UE means that the SL configuration received by the first UE has an error. For example, some data included in the SL configuration is missed or is damaged. As an instance, during a process that a message carrying the SL configuration is transmitted between the second UE and the first UE, the message carrying the SL configuration may be subjected to data damage or the like due to the influence of transmission quality, resulting in a SL configuration error. Or, during a process that the message is provided from the base station to the second UE and then from the second UE to the first UE as instructed by the base station, the message carrying the SL configuration will be subjected to data damage in the transmission process between the base station and the second UE, thereby causing the SL configuration error.

The case that the first UE rejects a received SL configuration means that the first UE rejects or discards the received SL configuration. In some cases, when the first UE is connected to another UE, since all communication resources of the first UE have already been occupied, the first UE may not be able to use the SL configuration. In some possible implementations, the first UE will reject the received SL configuration. Certainly, there is also a case where the first UE itself rejects configurations other than the SL configurations sent by a specific UE. The specific UE is a UE that is bound and connected to the first UE in advance.

The case that base station of the first UE rejects a received SL configuration means that the base station of the first UE rejects or discards the received SL configuration. It is understandable that in a case where the first UE needs to communicate with another UE through its base station, the base station of the first UE, acting as a scheduling organization for the first UE, may decide which UE(s) may communicate with the first UE and which UE(s) cannot communicate with the first UE. Rejecting, by the base station of the first UE, the received configuration may be similar to rejecting, by the first UE, the SL configuration. In some cases, when the base station of the first UE is in a connected state, the first UE may send a SL configuration to the base station of the first UE, so that the base station can determine whether it is usable based on the SL configuration. For example, when the SL configuration sent by the second UE includes a DRX configuration whose cycle happens to conflict with the cycle used by the base station for scheduling the first UE for transmission, the base station may notify the first UE to reject the SL configuration. That is, when the SL configuration conflicts with the configuration (s) of the base station of the first UE, the base station of the first UE rejects the SL configuration. Certainly, in a possible implementation, the base station of the first UE only accepts SL configurations sent by a specific UE, in which the specific UE is a UE that is bound and connected to the base station of the first UE in advance. In some possible implementations, the base station may send a message for indication that the SL configuration is rejected (e.g., a failure indication) to the first UE and then the message for indication that the SL configuration is rejected us sent by the first UE to the second UE. Certainly, it can also be implemented in other ways, which is not limited in embodiments of the disclosure. In embodiments of the disclosure, the step of determining, by the first UE, whether to use the SL configuration and the step of determining, by the base station of the first UE, whether to use the SL configuration may be performed in parallel or in serial. That is, in some possible implementations, after receiving a SL configuration, the first UE sends the SL configuration to the base station only when the first UE determines that the SL configuration is usable. In some possible implementations, after receiving a SL configuration, the first UE directly sends the SL configuration to the base station without determining whether the SL configuration is usable. In a possible application scenario, when the first UE is in a connected state, the base station determines which SL configuration(s) is/are usable or which SL configuration(s) is/are unusable. In another possible application scenario, when the first UE is in a non-connected state (e.g. inactive state or idle state), the first UE determines which SL configuration(s) is/are usable or which SL configuration(s) is/are unusable.

The "indication information" herein at least indicates: one or more sets of SL configurations not used by the first UE or one or more sets of SL configurations used by the first UE. In some embodiments, sending the indication information to the second UE through the SL may include: sending, to the second UE through the SL, a failure indication containing identifiers of SL configurations that are not used, or sending, to the second UE through the SL, a success indication containing identifiers of the SL configurations that are used.

It is noteworthy that the SL configurations provided by the second UE may be a plurality of sets of SL configurations. Different SL configurations have different identifiers.

For example, the identifier of a SL configuration may be set in a particular field in the message carrying the SL configuration. As an example, the identifier of the SL configuration may be set in a packet header of the message carrying the SL configuration. The first UE may inform the second UE of the one or more SL configurations that are unusable, by sending to the second UE the failure indication containing the identifiers of the SL configurations that are not used. Or, the first UE sends to the second UE the success indication containing the identifiers of the SL configurations that are used. Therefore, the first UE informs the second UE of the one or more SL configurations that are usable by sending to the second UE the success indication containing the identifiers of the SL configurations that are usable. Accordingly, after receiving the failure indication containing the identifiers of the SL configurations that are not used, the second UE may parse out, from the failure indication, the identifiers of the unused SL configurations to learn the SL configurations that are unusable by the first UE. Or, after receiving the success indication containing the identifiers of the SL configurations that are used, the second UE may parse out, from the success indication, the identifiers of the used SL configurations to learn the SL configurations that are usable by the first UE.

Compared to the related art in which the second UE cannot know exactly the SL configurations that are unusable by the first UE, in the disclosure, based on the failure indication, sent by the first UE to the second UE, for indicating the SL configurations that are not used by the first UE or the success indication, sent by the first UE to the second UE, for indicating the SL configurations that are used by the first UE, it is possible to reduce the time required by reconfiguring by the second UE all the SL configurations since the second UE does not know the one or more sets of SL configurations that are unusable by the first UE, and it is also possible to reduce the waste of communication resources occupied by the second UE to reconfigure the one or more sets of SL configurations that are usable by the first UE since the second UE does not know the one or more sets of SL configurations that are usable by the first UE, thereby improving the SL configuration efficiency for the first UE and improving the communication performance of the first UE.

In some embodiments, the SL configuration includes: a first configuration. The first configuration includes a first Discontinuous Reception (DRX) configuration of the SL.

In some embodiments, in order to save the power consumption of the UE, the DRX can be configured for the UE.

When the UE is in the connected state, the DRX configuration may include at least one of: inactivity timer, on duration timer, cycle and start offset, uplink Hybrid Automatic Repeat request Round-Trip Time (HARQ RTT) timer, downlink HARQ RTT timer, uplink retransmission timer, downlink retransmission timer, and so on. Certainly, other parameters may be included. The cycle and start offset may be used for determining a periodic start time point of the on duration timer. The inactivity timer is activated whenever the UE receives, on a Physical Downlink Control Channel (PDCCH), Downlink Control Information (DCI) carrying its own Cell-Radio Network Temporary Identifier (C-RNTI). The UE listens to the PDCCH only during the wake-up period, and the UE does not listen to the PDCCH at other times, thereby reducing the power consumption. After the UE receives a Medium Access Control (MAC) Protocol Data Unit (PDU) and sends a feedback to the base station, the downlink HARQ RTT timer of the corresponding HARQ process starts. When the uplink HARQ RTT timer of the downlink HARQ process expires, a downlink retransmission timer starts. When the UE sends a PUSCH transmission, the UE starts the uplink HARQ RTT timer of a corresponding HARQ process, and when the uplink HARQ RTT timer expires, an uplink retransmission timer starts. The wake-up period includes running times of the on duration timer, the inactivity timer, the uplink retransmission timer, and the downlink retransmission timer.

In this way, the UE can start a timer having a corresponding function based on the DRX configuration, to realize time control of more important functions such as wake-up, sleep, and retransmission.

In some embodiments, in order to reduce the power consumption of the UE on the SL, the SL DRX configuration is provided. For the broadcast and multicast connections, the DRX configuration of the SL of the first UE may be determined based on the type of the service. For the unicast connection, the DRX configuration of the SL of the first UE may be configured by the second UE or the base station of the second UE.

It is understandable that based on the DRX configuration of the SL of the first UE, the first UE may listen to the PSCCH only when it is activated, thereby achieving energy saving.

In some embodiments, in order to prevent data sent by the second UE from being lost, the second UE only sends SL data to the first UE within the activation time of the first UE.

In addition, in some embodiments, in configuring DRX of the SL of the first UE, DRX alignment of the SL for any two or three of the multicast connection, the unicast connection and the broadcast connection of the first UE, as well as the DRX alignment between the SL of the first UE and the Uu interface need to be taken into account, so that the activation times are overlapped, thereby ensuring the energy saving effect of the first UE.

A "first configuration" herein is a DRX configuration of the SL provided by the second UE to the first UE.

In some embodiments, the SL configuration includes: a second configuration. The second configuration includes: a configuration of the SL other than the DRX configuration.

The first configuration is different from the second configuration.

In all embodiments of the disclosure, a SL configuration may be, for example, a DRX configuration of the SL. In embodiments of the disclosure, the SL may include any kind of connection: unicast, multicast, and broadcast. Therefore, in some embodiments of the disclosure, when the UE has more than two kinds of SLs, the DRX configurations of the two or more kinds of SLs may be aligned, to allow the UE to adjust SL parameters of different connections to provide efficiency. For example, it is possible to make the DRX configurations of the UE adaptable to each other, so that the UE can reduce a number of wake-up times and/or a wake-up duration, to achieve the purpose of energy saving. In other embodiments of the disclosure, other parameters of the UE may also be coordinated with each other for the purpose of improving transmission efficiency and/or achieving energy saving, which is not limited in embodiments of the disclosure. That is, a SL configuration may include a DRX configuration, or a SL configuration may not include any DRX configuration, but may include any one or more of:

a data transmission configuration;

a SL bearer configuration; or a SL configuration other than the DRX configuration.

The data transmission configuration may include, but is not limited to: data transmission channels, data transmission methods, or data transmission occasions.

The SL bearer configuration includes, but is not limited to: a bearer identifier, a Service Data Adaptation Protocol (SDAP) configuration, a Packet Data Convergence Protocol (PDCP) configuration, a Radio Link Control (RLC) configuration, a logical channel configuration, a mirror (Quality of Service) QoS indicator, or a QoS parameter. The SDAP configuration includes at least one of: a NULL, a default bearer indication, a QoS flow list mapped to the bearer, or whether a SDAP header is included. The PDCP configuration includes at least one of: a packet discard timer, a PDCP sequence number length, a header compression or a reordering timer. The RLC configuration includes at least one of: an unacknowledged mode, an acknowledged mode, a polling-related configuration under the acknowledged mode, a maximum number of retransmissions in an acknowledged mode, or whether an out-of-order delivery is supported. The logical channel configuration includes at least one of: a logical channel identifier, a logical channel priority, a prioritized bit rate, a bucket size duration, a subcarrier spacing, an associated SL bandwidth part index or an associated carrier indication. The QoS parameter includes at least one of: a 5G QoS Identifier (5QI), an allocation and retention priority, a UE PC5 maximum aggregation bit rate (UE-PC5-MABR), a PC5 Guaranteed Flow Bit Rate (GFBR), and a PC5 Maximum Flow Bit Rate (MFBR). The PC5 mirror QoS indicator may be used to indicate at least one of: a priority, a packet delay, a false packet rate, a reliability, and a resource type.

The SL configuration other than the DRX configuration may be one of SL configurations specified in the R16 5G standard. The SL configurations specified in the R16 5G standard may include, but are not limited to, a SL resource configuration, a SL feedback configuration or a SL retransmission configuration. The SL resource configuration is used for configuring a SL resource pool for the UE. The SL feedback configuration includes at least one of: a SL feedback content, a SL feedback type, a SL feedback cycle, or a manner of mapping the SL feedback bits. The SL retransmission configuration includes at least one of: a SL retransmission manner, SL transmission reliability information, MAC retransmission configuration information, a SL feedback or transmission or retransmission resource, a parameter configuration mapped by a SL logical channel or bearer, or frame length information of a transmission time interval mapped by a SL logical signal or bearer.

In this way, the configuration other than the DRX configuration in the SL configuration may be used for providing the communication configuration for the UE during cellular communication.

That is, a "second configuration" herein may be provided by the second UE to the first UE and the cellular communication other than the DRX may be carried out for the first UE based on the second configuration.

In embodiments, the SL configurations provided by the second UE at least include: first configuration(s) and/or second configuration(s), so that the first UE is able to communicate based on the provided SL configurations.

Figure 5:
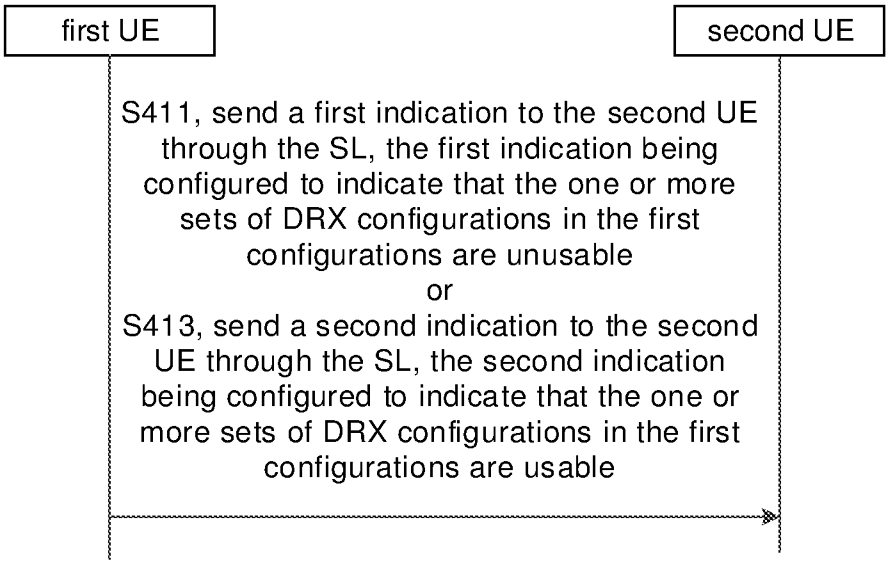
FIG. 5 is a flowchart illustrating a communication configuration method according to an embodiment.

As illustrated in FIG. 5, embodiments of the disclosure provide a communication configuration method, which is performed by a first UE. The method includes a block S411 or a block S412.

At block S411, a first indication is sent to the second UE through the SL, in which the first indication is configured to indicate that one or more sets of DRX configurations in the first configuration(s) are unusable.

At block S413, a second indication is sent to the second UE through the SL, in which the second indication is configured to indicate that one or more sets of DRX configurations in the first configuration(s) are usable.

In some embodiments, when the second UE receives the first indication, it indicates that the first UE is unable to use the first configuration(s). In other embodiments, when the second UE receives the second indication, it indicates that the first UE is able to use the first configuration(s).

It is noteworthy that the above block numbers are only for distinguishing the blocks and do not represent an order of execution or a combination of blocks.

In embodiments of the disclosure, when the second UE receives the first indication, it indicates that at least the one or more sets of DRX configurations of the first configuration (s) in the SL configurations provided by the second UE are unusable. For example, as illustrated in FIG. 3, the "first indication" herein may be carried in a feedback message of the RRC reconfiguration SL message, for example, carried in a configuration failure message. The "configuration failure message" herein may be, for example, the RRCReconfigurationFailureSidelink message.

When the second UE receives the second indication, it indicates that at least the one or more sets of DRX configurations of the first configuration(s) in the SL configurations provided by the second UE are usable. For example, as illustrated in FIG. 2, the "second indication" herein may be carried in a feedback message in the RRC reconfiguration SL message, for example, carried in a message for indicating that configurations take effect. The "message for indicating that the configurations take effect" herein may be, for example, the RRCReconfigurationCompleteSidelink message.

In embodiments of the disclosure, the second UE may know unusable SL configuration(s) through the received first indication, and then carry out a subsequent processing based on the unusable SL configuration(s). For example, a targeted reconfiguration processing may be carried out based on the unusable SL configuration(s). For example, through the received first indication, the second UE may know that the unusable SL configuration(s) is/are the first configuration(s), and then the first configuration(s) is/are reconfigured based on the first indication, thereby improving the configuration efficiency for the first UE. Or, through the received second indication, the second UE may know usable SL configuration(s) and then a subsequent processing is carried out based on the usable SL configuration(s). For example, a reconfiguration processing may be carried out, based on the usable SL configuration(s), on each configuration other than the usable SL configuration(s). For example, the second UE may carry out, based on the second indication, the reconfiguration processing on each configuration other than the first configuration(s). In some possible implementations, the second configuration(s) is/are reconfigured to improve the configuration efficiency for the first UE.

Figure 6:
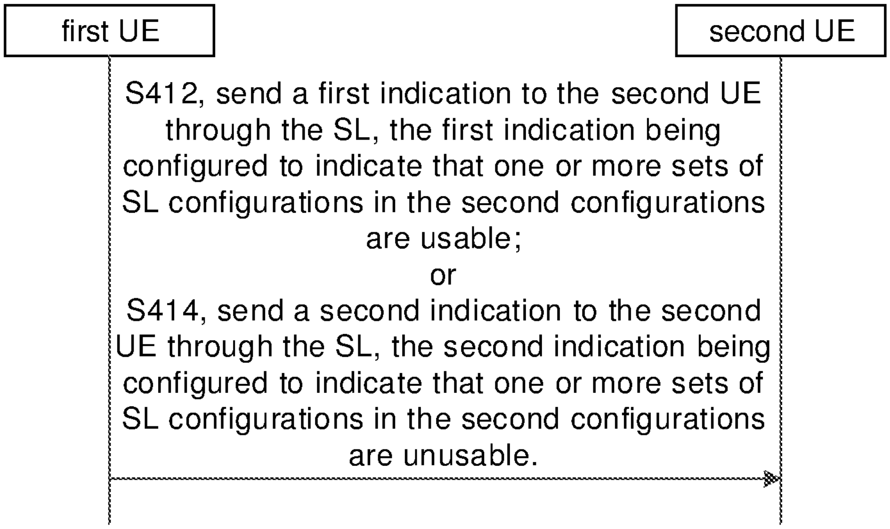
FIG. 6 is a flowchart illustrating a communication configuration method according to an embodiment.

As illustrated in FIG. 6, embodiments of the disclosure provide a communication configuration method, which is performed by a first UE. The method includes a block S412 or a block S414.

At block S412, a first indication is sent to the second UE through the SL, in which the first indication is configured to indicate that one or more sets of SL configurations in the second configuration(s) are usable.

At block S414, a second indication is sent to the second UE through the SL, in which the second indication is configured to indicate that one or more sets of SL configurations in the second configuration(s) are unusable.

It is noteworthy that the above block numbers are only for distinguishing the blocks and do not represent an order of execution or a combination of blocks.

In embodiments of the disclosure, when the second UE receives the first indication, it indicates that at least the one or more sets of SL configurations of the second configuration(s) in the SL configurations provided by the second UE are unusable. For example, as illustrated in FIG. 3, the "first indication" herein may be carried in a feedback message of the RRC reconfiguration SL message, for example, carried in a configuration failure message. The "configuration failure message" herein may be, for example, the RRCReconfigurationFailureSidelink message.

When the second UE receives the second indication, it indicates that at least the one or more sets of SL configurations of the second configuration(s) in the SL configurations provided by the second UE are usable. For example, as illustrated in FIG. 2, the "second indication" herein may be carried in a feedback message in the RRC reconfiguration SL message, e.g., in a message for indicating that configurations take effect. The "message for indicating that configurations take effect" herein may be, for example, the RRCReconfigurationCompleteSidelink message.

In embodiments of the disclosure, the second UE may know unusable SL configuration(s) through the received first indication, and then a subsequent processing is carried on based on the unusable SL configuration(s). For example, a targeted reconfiguration processing may be carried out based on the unusable SL configuration(s). For example, through the received first indication, the second UE may know that the usable SL configuration(s) is/are the second configuration(s), and then each configuration other than the second configuration(s) is reconfigured. In some possible implementations, the first configuration(s) is/are reconfigured to improve the configuration efficiency for the first UE. Or, through the received second indication, the second UE may know that the unusable SL configuration(s) is/are the second configuration(s) and then the subsequent processing is performed based on the unusable SL configuration(s). In some possible implementations, the second configuration(s) is/are reconfigured, to improve the configuration efficiency for the first UE.

As illustrated in FIGS. 5 and 6, embodiments of the disclosure provide a communication configuration method, which is performed by a first UE. In the method, the block S411 and the block S412 may be implemented together, and/or, the block S413 and the block S414 may be implemented together.

It is understandable that in the case where the one or more sets of DRX configurations of the first configuration(s) are unusable, but the one or more sets of SL configurations of the second configuration(s) are usable, the first UE may send the first indication to the second UE through the SL. The first indication may be used for indicating that the one or more sets of DRX configurations in the first configuration(s) are unusable and the one or more sets of SL configurations in the second configuration(s) are usable.

It is understandable that in the case where the one or more sets of DRX configurations in the first configuration(s) are usable, but the one or more sets of SL configurations in the second configuration(s) are unusable, the first UE may send the second indication to the second UE through the SL. The second indication may be used for indicating that the one or more sets of DRX configurations in the first configuration(s) are usable and the one or more sets of SL configurations in the second configuration(s) are unusable.

In some embodiments, the first indication includes a first configuration request indication.

The first configuration request indication is configured to indicate a request to the second UE for sending a new DRX configuration of the SL.

In some implementations, the new DRX configuration of the SL may be a DRX configuration of the SL that is recommended by the first UE for use, or a DRX configuration of the SL that is recommended by the base station of the first UE for use. In other embodiments, the new DRX configuration of the SL may be a DRX configuration of the SL that is adapted to current communication resources of the first UE and determined by a communication protocol of the first UE.

In embodiments of the disclosure, the first configuration request indication may implicitly indicate the first configuration(s) in the SL configurations is/are unusable.

The new DRX configuration of the SL may be a DRX configuration of the SL that needs to be used for overlapping the activation times of the first UE in various cases.

As illustrated in FIG. 2, the first configuration request indication may be carried in the message for indicating that configurations take effect. For example, the message for indicating that configurations take effect may be the RRCReconfigurationCompleteSidelink message.

In some embodiments, the second indication includes a second configuration request indication.

The second configuration request indication is configured to indicate a request to the second UE for sending a new configuration other than a DRX configuration of the SL.

In some implementations, the new configuration other than the DRX configuration of the SL may be a configuration other than the DRX configuration of the SL that is recommended by the first UE for use. In other embodiments, the new configuration other than the DRX configuration of the SL may be a configuration other than the DRX configuration of the SL that is adapted to current communication resources of the first UE and determined by a communication protocol of the first UE.

In embodiments of the disclosure, the second configuration request indication may implicitly indicate that the second configuration(s) in the SL configurations are unusable.

As illustrated in FIG. 2, the second configuration request indication may be carried in the message for indicating that configurations take effect. For example, the message for indicating that configurations take effect may be the RRCReconfigurationCompleteSidelink message.

Embodiments of the disclosure provides a communication configuration method, which is performed by a first UE. The method includes:

using a first default configuration in response to determining, by the first UE, that the DRX configurations in the SL configurations are unusable, in which the first default configuration is a DRX configuration determined by the first UE based on a communication protocol, a current DRX configuration of the first UE, or a default DRX configuration of the first UE.

In a possible implementation, the DRX configuration determined by the first UE based on the communication protocol may be a DRX configuration determined based on the communication protocol that is used by the first UE before receiving the SL configurations provided by the second UE. The current DRX configuration of the first UE may be a DRX that is currently used by the first UE. The default DRX configuration of the first UE may be a default DRX configuration that is preset for the first UE, which is different from the DRX configurations provided by the second UE. In a possible implementation, the default DRX configuration may or may not be the current DRX configuration. The first UE may change the currently used DRX configuration to the default DRX configuration when the DRX configurations in the SL configurations provided by the second UE received by the first UE are unusable.

In a possible implementation, the first UE may determine to use the first default configuration before or when or after the first UE sends the first indication. It is noteworthy that since the first indication is used for indicating that one or more sets of DRX configurations in the first configuration(s) are unusable, the DRX configurations of the SL provided by the second UE are unusable. In embodiments of the disclosure, the first UE may ensure the DRX communication of the first UE and save power of the first UE by using the first default configuration, i.e., by using the DRX configuration determined based on the communication protocol, or by using the current DRX configuration, or by using the default DRX configuration of the first UE.

Embodiments of the disclosure provides a communication configuration method, which is performed by a first UE. The method includes:

using a second default configuration, in response to determining by the first UE that configurations in the SL configurations other than the DRX configurations are unusable, in which the second default configuration is a configuration, in the SL configurations other than the DRX configurations, determined by the first UE based on the communication protocol, a current configuration in the SL configurations other than the DRX configurations of the first UE, or a default configuration in the SL configurations other than the DRX configurations of the first UE.

In a possible implementation, the configuration other than the DRX configurations in the SL configurations determined by the first UE based on the communication protocol may be any configuration other than the DRX configurations in the SL configurations that is determined by the first UE based on a communication protocol before receiving the SL configurations provided by the second UE. The current configuration other than the DRX configurations in the SL configurations of the first UE may be a configuration other than the DRX configurations in the SL configurations that is currently used by the first UE. The default configuration other than the DRX configurations in the SL configurations of the first UE may be a configuration other than the DRX configurations in SL configurations that is preset for the first UE. The default configuration other than the DRX configurations in the SL configurations of the first UE is different from the configurations other than the DRX configurations in the SL configurations provided by the second UE. In a possible implementation, the default configuration other than the DRX configurations in the SL configurations may or may not be the current configuration other than the DRX configurations in the SL configurations. When the configurations other than the DRX configurations in the SL configurations provided by the second UE received by the first UE are unusable, the first UE may change the currently used configuration other than the DRX configurations in the SL configurations to the default configuration other than the DRX configurations in the SL configurations.

In a possible implementation, the first UE may use the second default configuration before or when or after sending the second indication. It is noteworthy that the second indication is used for indicating that one or more sets of SL configurations in the second configuration(s) are unusable, i.e., configurations of the SL other than DRX configurations provided by the second UE are unusable. In embodiments of the disclosure, the first UE may ensure normal communication of the first UE by using the second default configuration, i.e., by using a configuration in the SL configurations other than the DRX configurations determined by the first UE based on the communication protocol, a current configuration in the SL configurations other than the DRX configurations of the first UE, or a default configuration in the SL configurations other than the DRX configurations of the first UE.

In some embodiments, the SL configurations are sent by the second UE through a RRC reconfiguration SL message.

As illustrated in FIG. 2 or FIG. 3, the RRC reconfiguration SL message can be the RRCReconfigurationSidelink message.

In embodiments, the SL configurations provided by the second UE are carried in the RRC reconfiguration SL message, so that the first UE can provide a configuration feedback based on the RRC reconfiguration message, without occupying other communication resources and thus the communication configuration method according to above embodiments can be realized by adopting original communication resources, so as to make the implementation of the communication configuration method simpler and more versatile.

It is noteworthy that those skilled in the art may understand that the methods according to embodiments of the disclosure may be performed alone or together with some of the methods according to embodiments of the disclosure or some of the methods in the related art.

The following communication configuration methods performed by the second UE are similar to the communication configuration methods performed by the first UE described above. The technical details not disclosed in embodiments of the communication configuration method performed by the second UE may be referred to the description of the examples of the communication configuration method performed by the first UE, which will not be described and illustrated in detail herein.

Figure 7:
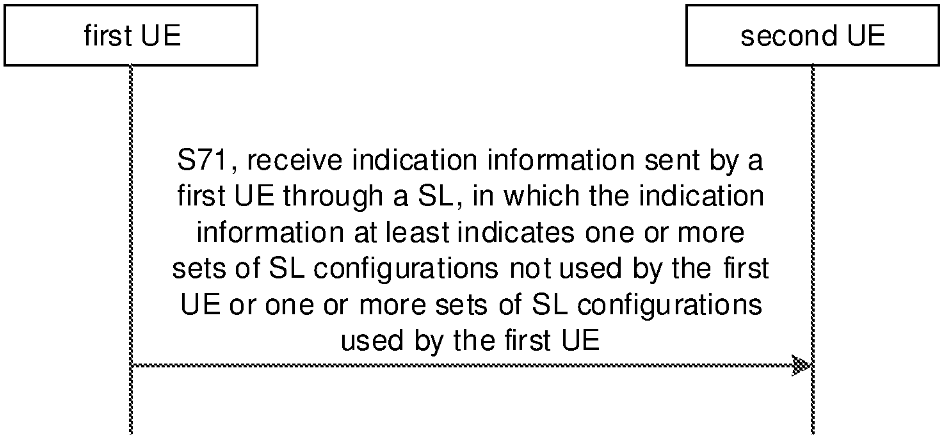
FIG. 7 is a flowchart illustrating a communication configuration method according to an embodiment.

As illustrated in FIG. 7, a communication configuration method performed by a second UE is provided. The method includes the following.

At block S71, indication information sent by a first UE through a SL is received, in which the indication information at least indicates: one or more sets of SL configurations not used by the first UE or one or more sets of SL configurations used by the first UE.

In some embodiments of the disclosure, the "indication information" herein may be the indication information in the block S41, the "SL: herein may be the SL in the block S41, the "first UE" herein may be the first UE in the block S41, and the "second UE" herein may be the second UE in the block S41.

In some embodiments, the SL configurations include first configuration(s), in which the first configuration(s) includes one or more sets of DRX configurations of the SL.

Figure 8:
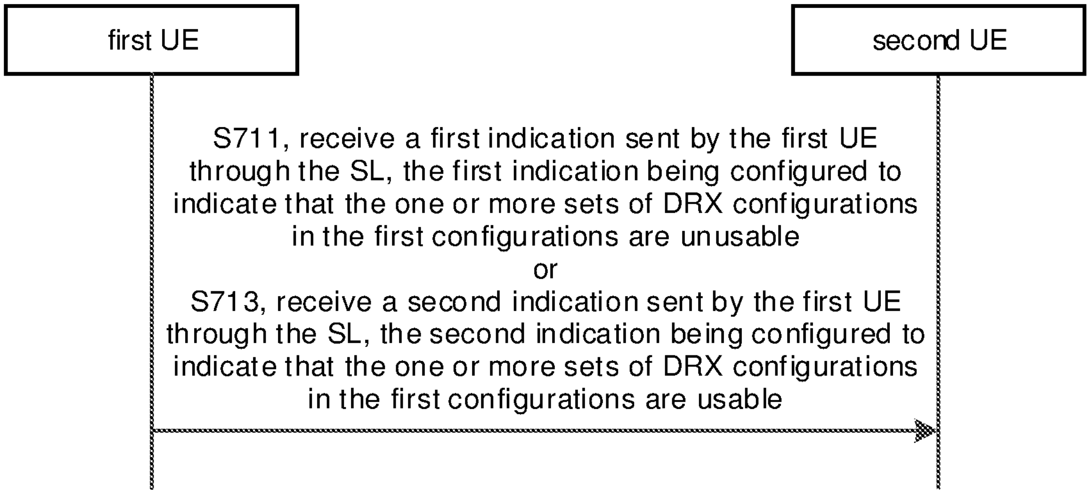
FIG. 8 is a flowchart illustrating a communication configuration method according to an embodiment.

As illustrated in FIG. 8, a communication configuration method performed by a second UE is provided according to embodiments of the disclosure. The method includes a block S711 or a block S713.

At block S711, a first indication sent by the first UE through the SL is received, in which the first indication is configured to indicate that the one or more sets of DRX configurations in the first configuration(s) are unusable.

At block S713, a second indication sent by the first UE through the SL is received, in which the second indication is configured to indicate that the one or more sets of DRX configurations in the first configuration(s) are usable.

In some embodiments of the disclosure, the SL configurations include: second configuration(s), in which the second configuration(s) includes configurations other than the DRX configurations of the SL.

In some embodiments, the second configuration includes at least one of:

a data transmission configuration;

a SL bearer configuration; or a SL configuration other than the DRX configuration.

Figure 9:
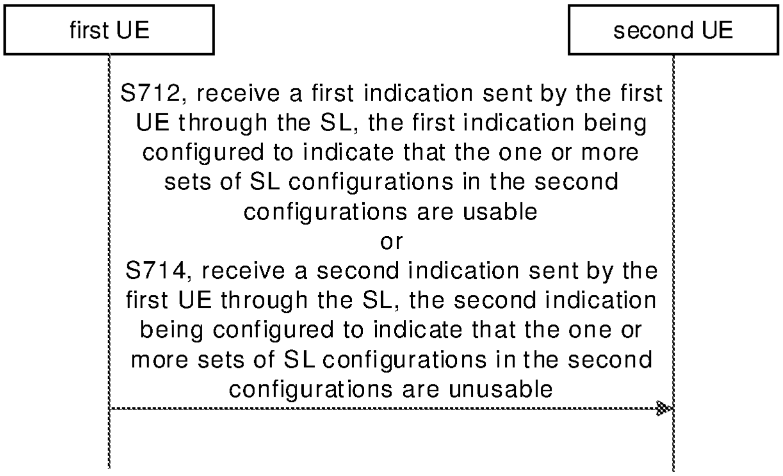
FIG. 9 is a flowchart illustrating a communication configuration method according to an embodiment.

As illustrated in FIG. 9, a communication configuration method performed by a second UE is provided in embodiments of the disclosure. The method includes a block S712 or a block S714.

At block S712, a first indication sent by the first UE through the SL is received, in which the first indication is configured to indicate that one or more sets of SL configurations in the second configuration(s) are usable.

At block S714, a second indication sent by the first UE through the SL is received, in which the second indication is configured to indicate that one or more sets of SL configurations in the second configuration(s) are unusable.

In some embodiments, the first indication includes a first configuration request indication.

The first configuration request indication is configured to indicate a request to the second UE for sending a new DRX configuration of the SL.

In some embodiments, the second indication includes a second configuration request indication.

The second configuration request indication is configured to indicate a request to the second UE for sending a new configuration other than the DRX configuration of the SL.

Embodiments of the disclosure provide a communication configuration method performed by a second UE. The method includes at least one of:

determining that the first UE uses a first default configuration, in response to the indication information indicating that the DRX configurations in the SL configurations are unusable, in which the first default configuration is: a DRX configuration determined by the first UE based on a communication protocol, a current DRX configuration of the first UE, or a default DRX configuration of the first UE;

stopping a timer on the SL in response to the indication information indicating that the DRX configurations in the SL configurations are unusable; or sending a third indication to a base station in response to the indication information indicating that the DRX configurations in the SL configurations are unusable, in which the third indication is configured to indicate that the DRX configurations of the SL provided to the first UE are unusable.

For example, when the second UE receives the indication information indicating that the DRX configurations in the SL configurations are unusable, it indicates that the first UE cannot use the first configuration(s). At this time, the first UE determines to use the first default configuration, and the second UE can communicate with the first UE based on the first default configuration, so that the data loss caused by sending by the second UE data to the first UE when the first UE is in a sleep state or the like, thereby improving the communication performance.

In addition, as illustrated in FIGS. 2 and 3, the second UE sends the feedback message of the RRC reconfiguration SL message to the first UE. For example, after the RRCReconfigurationSidelink message of configuration failure, the inactivity timer starts. When the inactivity timers expires, SL failure is triggered, and the PC5-RRC connection and all SL bearers are released.

The timer on the SL may be the inactivity timer started after the second UE sends the RRC reconfiguration SL message. For example, the timer on the SL may be a T400 timer.

In embodiments, when the second UE receives the indication information, it actively stops the timer on the SL, to reduce the SL disconnection phenomenon due to the expiration of the timer.

For example, in the scenario in which the base station is involved in scheduling between the second UE and the first UE, when the second UE receives the indication information from the first UE, and the configuration message indicates that the DRX configurations in the SL configurations are unusable, the second UE reports a configuration failure message for the DRX configurations in the SL configurations provided to the first UE to the base station. In a possible implementation, the third indication may indicate that the first configuration(s) the second UE fails to configure the first configuration(s) of the first UE.

In embodiments, the base station of the second UE may clearly know what kind of configurations to the first UE has failed, and thus the time required by attempting to reconfigure different SL configurations when the base station does not know the unusable SL configurations may be reduced, thereby improving the configuration efficiency of the base station for the first UE through the second UE.

In some embodiments, sending the third indication to the base station, includes:

in response to the second UE being connected to the base station, sending the third indication to the base station.

In embodiments, the third indication is sent to the base station only when the second UE is connected to the base station, thereby reducing the data loss caused by sending the data when the second UE is not connected to the base station.

Embodiments of the disclosure provide a communication configuration method performed by a second UE. The method includes at least one of:

in response to the indication information indicating that configurations other than the DRX configurations in the SL configurations are unusable, determining that the first UE uses a second default configuration, in which the second default configuration is a configuration in the SL configurations other than the DRX configurations determined by the first UE based on a communication protocol, a current configuration in the SL configurations other than the DRX configurations of the first UE, or a default configuration in the SL configurations other than the DRX configurations of the first UE;

in response to the indication information indicating that configurations other than the DRX configurations in the SL configurations are unusable, stopping a timer on the SL; or in response to the indication information indicating that configurations other than the DRX configurations in the SL configurations are unusable, sending a fourth indication to the base station, in which the fourth indication is configured to indicate a failure of configurations other than the DRX configurations of the SL provided to the first UE.

In embodiments, when the indication information indicates that the configurations other than the DRX configurations in the SL configurations are unusable, in a possible implementation, it indicates that the first UE cannot use the second configuration(s), and it is determined that the first UE uses the second default configuration, so that the second UE may communicate with the first UE based on the second default configuration, thereby improving the communication performance.

In addition, as illustrated in FIGS. 2 and 3, after the second UE sends the feedback message of the RRC reconfiguration SL message, e.g., the RRCReconfigurationSidelink message of configuration failure, to the first UE, the inactivity timer starts. When the inactivity timer expires, SL failure is triggered and the PC5-RRC connection and all the SL bearers are released.

The timer on the SL may be the inactivity timer that is activated by the second UE after sending the RRC reconfiguration SL message. For example, the timer on the SL may be a T400 timer.

In embodiments, when the second UE receives the indication information, it actively stops the timer on the SL, thereby reducing the SL disconnection phenomenon due to the expiration of the timer.

For example, in the scenario in which the base station is involved in scheduling between the second UE and the first UE, when the second UE receives the indication information sent by the first UE, and the indication information indicates that configurations other than the DRX configurations in the SL configurations are unusable, the second UE reports a configuration failure message for the configurations other than the DRX configurations in the SL configurations provided to the first UE to the base station. In a possible implementation, the fourth indication may indicate that the second UE fails to configure the second configuration(s) of the first UE.

In embodiments, the base station of the second UE may clearly know what kind of configurations of the first UE has failed, and thus the time required by attempting to reconfigure different SL configurations when the base station does not know the unusable SL configurations may be reduced, thereby improving the configuration efficiency of the base station for the first UE through the second UE.

In some embodiments, sending the fourth indication to the base station, includes:

in response to the second UE being connected to the base station, sending the fourth indication to the base station.

In embodiments, the fourth indication is sent to the base station only when the second UE is connected to the base station, thereby reducing the data loss caused by sending the data when the second UE is not connected to the base station.

Embodiments of the disclosure provide a communication configuration method performed by a second UE. The method further includes:

sending the SL configurations through a RRC reconfiguration SL message.

It is noteworthy that those skilled in the art may understand that the methods according to embodiments of the disclosure may be performed alone or in combination with some of the methods according to embodiments of the disclosure or some of the methods in the related art.

Figure 10:
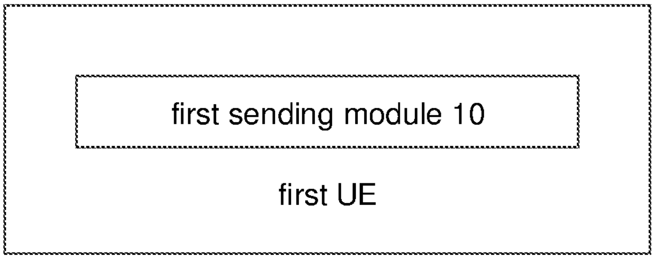
FIG. 10 is a block diagram illustrating a communication configuration apparatus according to an embodiment.

As illustrated in FIG. 10, a communication configuration apparatus, applied to a first UE, is provided. The apparatus includes:

a first sending module 10, configured to, in response to at least a part of SL configurations provided by a second UE being unusable, send indication information to the second UE through a SL, in which the indication information at least indicates: one or more sets of SL configurations not used by the first UE or one or more sets of SL configurations used by the first UE.

In some embodiments, the SL configurations include: first configurations, the first configurations including one or more sets of DRX configurations of the SL.

Embodiments of the disclosure provide the communication configuration apparatus, which is applied to the first UE. The apparatus includes: the first sending module 10. The first sending module 10 is configured to:

send a first indication to the second UE through the SL, the first indication being configured to indicate that the one or more sets of DRX configurations in the first configurations are unusable;

or send a second indication to the second UE through the SL, the second indication being configured to indicate that the one or more sets of DRX configurations in the first configurations are usable.

In some embodiments, the SL configurations include: second configurations, the second configurations including configurations other than DRX configurations of the SL.

In some embodiments, the second configuration includes at least one of:

a data transmission configuration;

a SL bearer configuration; or a SL configuration other than the DRX configurations.

Embodiments of the disclosure provide the communication configuration apparatus, which is applied to the first UE. The apparatus includes: the first sending module 10. The first sending module 10 is configured to:

receive a first indication sent by the first UE through the SL, the first indication being configured to indicate that one or more sets of SL configurations in the second configurations are usable;

or receive a second indication sent by the first UE through the SL, the second indication being configured to indicate that one or more sets of SL configurations in the second configurations are unusable.

In some embodiments, the first indication includes:

a first configuration request indication, in which the first configuration request indication is configured to indicate a request to the second UE for sending a new DRX configuration of the SL.

In some embodiments, the second indication includes:

a second configuration request indication, in which the second configuration request indication is configured to indicate a request to the second UE for sending a new configuration other than DRX configurations of the SL.

Figure 11:
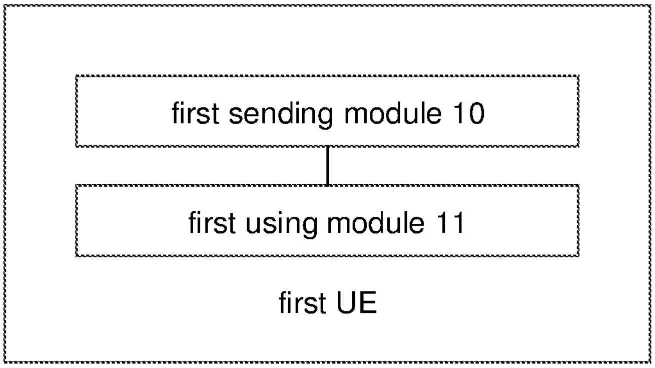
FIG. 11 is a block diagram illustrating a communication configuration apparatus according to an embodiment.
Figure 12:
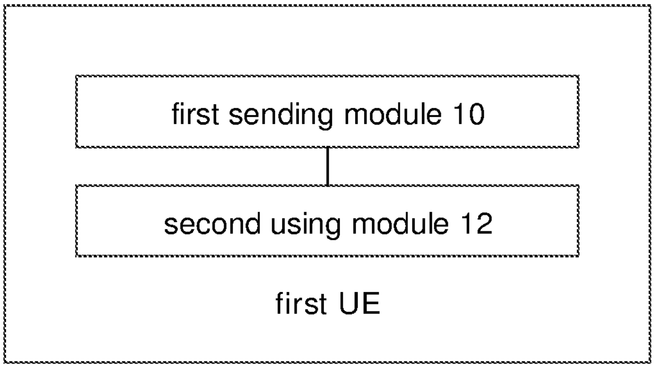
FIG. 12 is a block diagram illustrating a communication configuration apparatus according to an embodiment.

As illustrated in FIG. 11, a communication configuration apparatus, applied to a first UE, is provided. The apparatus includes:

a first sending module 10, configured to, in response to at least a part of a SL configuration provided by a second UE being unusable, send indication information to the second UE through a SL, in which the indication information at least indicates: one or more sets of SL configurations not used by the first UE or one or more sets of SL configurations used by the first UE; and a first using module 11, configured to, in response to the first UE determining that DRX configurations in the SL configurations are unusable, use a first default configuration, in which the first default configuration is a DRX configuration determined by the first UE based on a communication protocol, a current DRX configuration of the first UE, or a default DRX configuration of the first UE.

As illustrated in FIG. 11, a communication configuration apparatus, applied to a first UE, is provided. The apparatus includes:

a first sending module 10, configured to, in response to at least a part of SL configurations provided by a second UE being unusable, send indication information to the second UE through a SL, in which the indication information at least indicates: one or more sets of SL configurations not used by the first UE or one or more sets of SL configurations used by the first UE; and a second using module 12, configured to, in response to the first UE determining that configurations in the SL configurations other than the DRX configurations are unusable, use a second default configuration, in which the second default configuration is a configuration in the SL configurations other than the DRX configurations determined by the first UE based on a communication protocol, a current configuration in the SL configurations other than the DRX configurations of the first UE, or a default configuration in the SL configurations other than the DRX configurations of the first UE.

In some embodiments, the SL configurations are sent by the second UE through a RRC reconfiguration SL message.

With respect to the apparatus according to above embodiments, the specific manner in which each module performs an operation has been described in detail in embodiments relating to the method, and will not be described in detail herein.

Figure 13:
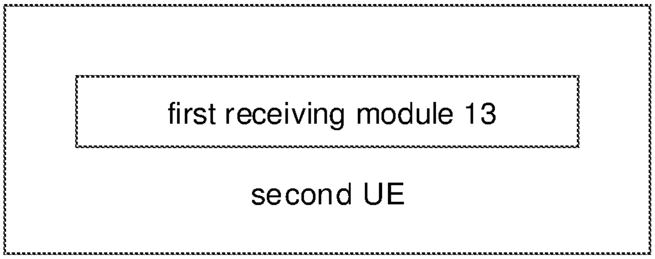
FIG. 13 is a block diagram illustrating a communication configuration apparatus according to an embodiment.

As illustrated in FIG. 13, a communication configuration apparatus, applied to a second UE, is provided. The apparatus includes:

a first receiving module 13, configured to receive indication information sent by a first UE through a SL, in which the indication information at least indicates: one or more sets of SL configurations not used by the first UE or one or more sets of SL configurations used by the first UE.

In some embodiments, the SL configurations include: first configurations, the first configurations including one or more sets of DRX configurations of the SL.

Embodiment of the disclosure provides the communication configuration apparatus, which is applied to the second UE. The apparatus includes: the first receiving module 13. The first receiving module 13 is configured to:

receive a first indication sent by the first UE through the SL, the first indication being configured to indicate that the one or more sets of DRX configurations in the first configurations are unusable;

or receive a second indication sent by the first UE through the SL, the second indication being configured to indicate that the one or more sets of DRX configurations in the first configurations are usable.

In some embodiments, the SL configurations include: second configurations, the second configurations including configurations other than DRX configurations of the SL.

In some embodiments, the second configuration includes at least one of:

a data transmission configuration;

a SL bearer configuration; or a SL configuration other than the DRX configurations.

Embodiments of the disclosure provide the communication configuration apparatus, which is applied to the second UE. The apparatus includes: the first receiving module 13. The first receiving module 13 is configured to:

receive a first indication sent by the first UE through the SL, the first indication being configured to indicate that one or more sets of SL configurations in the second configurations are usable;

or receive a second indication sent by the first UE through the SL, the second indication being configured to indicate that one or more sets of SL configurations in the second configurations are unusable.

In some embodiments, the first indication includes:

a first configuration request indication, in which the first configuration request indication is configured to indicate a request to the second UE for sending a new DRX configuration of the SL.

In some embodiments, the second indication includes:

a second configuration request indication, in which the second configuration request indication is configured to indicate a request to the second UE for sending a new configuration other than DRX configurations of the SL.

Embodiments of the disclosure provide the communication configuration apparatus, which is applied to the second UE. The apparatus includes at least one of:

a first determining module, configured to, in response to the indication information indicating that DRX configurations in the SL configurations are unusable, determine that the first UE uses a first default configuration, in which the first default configuration is: a DRX configuration determined by the first UE based on a communication protocol, a current DRX configuration of the first UE, or a default DRX configuration of the first UE;

a first stopping module, configured to, in response to the indication information indicating that DRX configurations in the SL configurations are unusable, stop a timer on the SL; or a second sending module, configured to, in response to the indication information indicating that DRX configurations in the SL configurations are unusable, send a third indication to a base station, in which the third indication is configured to indicate that the DRX configurations of the SL provided to the first UE are unusable.

Embodiments of the disclosure provide the communication configuration apparatus, which is applied to the second UE. The apparatus includes: the second sending module. The second sending module is further configured to:

in response to the second UE being connected to the base station, send the third indication to the base station.

Embodiments of the disclosure provide the communication configuration apparatus, which is applied to the second UE. The apparatus includes at least one of:

a second determining module, configured to, in response to the indication information indicating that configurations other than the DRX configurations in the SL configurations are unusable, determine that the first UE uses a second default configuration, in which the second default configuration is a configuration in the SL configurations other than the DRX configurations determined by the first UE based on the communication protocol, a current configuration in the SL configurations other than the DRX configurations of the first UE, or a default configuration in the SL configurations other than the DRX configurations of the first UE;

a second stopping module, configured to, in response to the indication information indicating that configurations other than the DRX configurations in the SL configurations are unusable, stop a timer on the SL; or a third sending module, configured to, in response to the indication information indicating that configurations other than the DRX configurations in the SL configurations are unusable, send a fourth indication to the base station, in which the fourth indication is configured to indicate a failure of configurations other than the DRX configurations od the SL provided to the first UE.

Embodiments of the disclosure provide the communication configuration apparatus, which is applied to the second UE. The apparatus includes: the third sending module. The third sending module is further configured to:

in response to the second UE being connected to the base station, send the fourth indication to the base station.

Embodiments of the disclosure provide the communication configuration apparatus, which is applied to the second UE. The apparatus includes:

a fourth sending module, configured to send the SL configurations through a RRC reconfiguration SL message.

With respect to the apparatus according to above embodiments, the specific manner in which each module performs an operation has been described in detail in embodiments relating to the method, and will not be described in detail herein.

Embodiments of the disclosure provide a communication device. The communication device includes:

a processor; and a memory for storing instructions executable by the processor; in which the processor is configured to perform the communication configuration method according to any embodiment of the disclosure when running the executable instructions.

In an embodiment, the communication device may be a network device or a UE. The network device may be a base station or a core network device.

The processor may include various types of storage mediums. The storage medium can be a non-transitory computer storage medium capable of continuing to memorize information stored thereon after the UE is powered down.

The processor may be connected to the memory via a bus or the like for reading executable programs stored on the memory, e.g., at least one of the methods as shown in FIGS. 2 to 7.

Embodiments of the disclosure also provide a computer storage medium having a computer executable program stored thereon. When the executable program is executed by a processor, the communication configuration method according to any embodiment of the disclosure is performed, for example, at least one of the methods as shown in FIGS. 8 to 9.

With respect to the apparatus or storage medium in above embodiments, the specific manner in which each module performs an operation has been described in detail in embodiments relating to the method, and will not be described in detail herein.

Figure 14:
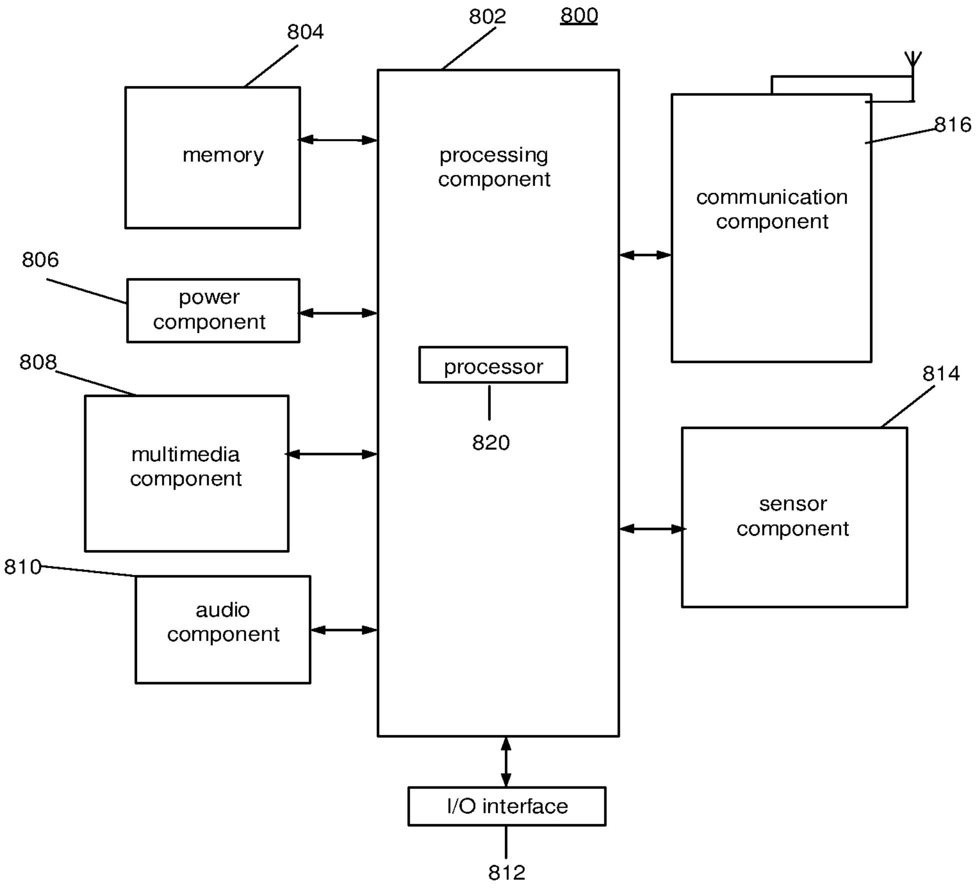
FIG. 14 is a block diagram illustrating a UE according to an embodiment.

FIG. 14 is a block diagram illustrating a UE 800 according to an embodiment. For example, the UE 800 may be a mobile phone, a computer, a digital broadcasting UE, a message transceiver device, a game console, a tablet device, a medical device, a fitness device, and a personal digital assistant.

As illustrated in FIG. 14, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 820 to perform all or part of the steps in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, video, etc. The memory 804 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of wakeup time and a pressure associated with the touch or swipe action. In some embodiments, the multimedia component 808 includes a front-facing camera and/or a rear-facing camera. When the UE 800 is in an operating mode, such as a shooting mode or a video mode, the front-facing camera and/or the rear-facing camera can receive external multimedia data. Each of the front-facing camera and the rear-facing camera may be a fixed optical lens system or has focal length and optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of a user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a Complementary Metal Oxide Semiconductor (CMOS) or Charge-Coupled Device (CCD) image sensor, for using in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as Wi-Fi, 2G or 3G, or a combination thereof. In an embodiment, the communication component 816 receives a broadcast signal from an external broadcast management system or broadcast associated information via a broadcast channel. In an embodiment, the communication component 816 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the embodiments, the UE 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In the embodiments, there is also provided a non-transitory computer readable storage medium including instructions, such as the memory 804, executable by the processor 820 in the UE 800, for performing the above methods. For example, the non-transitory computer-readable storage medium may be a ROM, a Random Access Memory (RAM), a CD-ROM, a magnetic tape, a floppy disc, and an optical data storage device.

Figure 15:
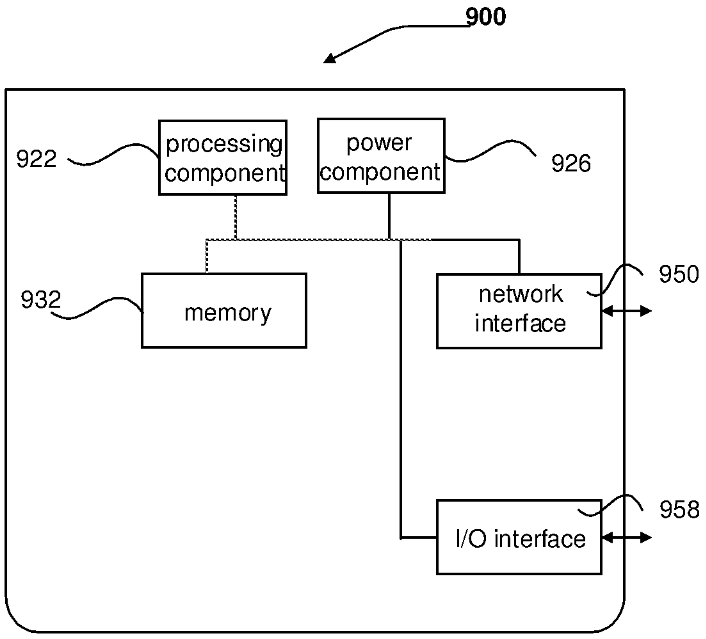
FIG. 15 is a block diagram illustrating a base station according to an embodiment.

As illustrated in FIG. 15, an embodiment of the disclosure illustrates an architecture of a base station 900. For example, the base station 900 may be provided as a network side device. As illustrated in FIG. 15, the base station 900 includes a processing component 922, which further includes one or more processors, and memory resources represented by a memory 932 for storing instructions that may be executed by the processing component 922, such as applications. The applications stored in the memory 932 may include one or more modules each corresponding to a set of instructions. Moreover, the processing component 922 is configured to execute instructions to perform any of the methods applied to the base station as described above, for example, the methods shown in FIGS. 4-10.

The base station 900 may also include a power component 926 configured to perform power management of the base station 900, a wired or wireless network interface 950 configured to connect the base station 900 to a network, and an input-output (I/O) interface 958. The base station 900 may operate based on an operating system stored in the memory 932, such as Windows Server™, Mac OS X™, Unix™, Linux™, FreeBSD™, or the like.

In some embodiments, a communication configuration method performed by a first UE includes: sending indication information to a second UE through a sidelink (SL) in response to at least a part of SL configurations provided by the second UE being unusable, in which the indication information at least indicates: one or more sets of SL configurations not used by the first UE or one or more sets of SL configurations used by the first UE.

In some embodiments, the SL configurations include: first configurations, the first configurations including one or more sets of Discontinuous Reception (DRX) configurations of the SL.

In some embodiments, sending the indication information to the second UE through the SL in response to at least a part of the SL configurations provided by the second UE being unusable includes: sending a first indication to the second UE through the SL, the first indication being configured to indicate that the one or more sets of DRX configurations in the first configurations are unusable; or sending a second indication to the second UE through the SL, the second indication being configured to indicate that the one or more sets of DRX configurations in the first configurations are usable.

In some embodiments, the SL configurations include: second configurations, the second configurations including configurations other than DRX configurations of the SL.

In some embodiments, the second configuration includes at least one of: a data transmission configuration; a SL bearer configuration; or a SL configuration other than the DRX configurations.

In some embodiments, sending the indication information to the second UE through the SL in response to at least a part of the SL configurations provided by the second UE being unusable includes: sending a first indication to the second UE through the SL, the first indication being configured to indicate that one or more sets of SL configurations in the second configurations are usable; or sending a second indication to the second UE through the SL, the second indication being configured to indicate that one or more sets of SL configurations in the second configurations are unusable.

In some embodiments, the first indication includes: a first configuration request indication, in which the first configuration request indication is configured to indicate a request to the second UE for sending a new DRX configuration of the SL.

In some embodiments, the second indication includes: a second configuration request indication, in which the second configuration request indication is configured to indicate a request to the second UE for sending a new configuration other than the DRX configurations of the SL.

In some embodiments, the method includes: using a first default configuration in response to the first UE determining that DRX configurations in the SL configurations are unusable, in which the first default configuration is a DRX configuration determined by the first UE based on a communication protocol, a current DRX configuration of the first UE, or a default DRX configuration of the first UE.

In some embodiments, the method includes: using a second default configuration in response to the first UE determining that configurations in the SL configurations other than DRX configurations are unusable, in which the second default configuration is a configuration other than the DRX configurations in the SL configurations determined by the first UE based on a communication protocol, a current configuration in the SL configurations of the first UE other than the DRX configurations, or a default configuration in the SL configurations other than the DRX configurations of the first UE.

In some embodiments, the SL configurations are sent by the second UE through a Radio Resource Control (RRC) reconfiguration SL message.

In some embodiments, a communication configuration method performed by a second UE includes: receiving indication information sent by a first UE through a SL, in which the indication information at least indicates: one or more sets of SL configurations not used by the first UE or one or more sets of SL configurations used by the first UE.

In some embodiments, the SL configurations include: first configurations, the first configurations including one or more sets of DRX configurations of the SL.

In some embodiments, receiving the indication information sent by the first UE through the SL includes: receiving a first indication sent by the first UE through the SL, the first indication being configured to indicate that the one or more sets of DRX configurations in the first configurations are unusable; or receiving a second indication sent by the first UE through the SL, the second indication being configured to indicate that the one or more sets of DRX configurations in the first configurations are usable.

In some embodiments, the SL configurations include: second configurations, the second configurations including configurations other than DRX configurations of the SL.

In some embodiments, the second configuration includes at least one of: a data transmission configuration; a SL bearer configuration; or a SL configuration other than the DRX configurations.

In some embodiments, receiving the indication information sent by the first UE through the SL includes: receiving a first indication sent by the first UE through the SL, the first indication being configured to indicate that one or more sets of SL configurations in the second configurations are usable;

or receiving a second indication sent by the first UE through the SL, the second indication being configured to indicate that one or more sets of SL configurations in the second configurations are unusable.

In some embodiments, the first indication includes: a first configuration request indication, in which the first configuration request indication is configured to indicate a request to the second UE for sending a new DRX configuration of the SL.

In some embodiments, the second indication includes: a second configuration request indication, in which the second configuration request indication is configured to indicate a request to the second UE for sending a new configuration other than DRX configurations of the SL.

In some embodiments, the method further includes at least one of: determining that the first UE uses a first default configuration in response to the indication information indicating that DRX configuration in the SL configurations are unusable, in which the first default configuration is: a DRX configuration determined by the first UE based on a communication protocol, a current DRX configuration of the first UE, or a default DRX configuration of the first UE; stopping a timer on the SL in response to the indication information indicating that DRX configurations in the SL configurations are unusable; or sending a third indication to a base station in response to the indication information indicating that DRX configurations in the SL configurations are unusable, in which the third indication is configured to indicate that the DRX configurations in the SL configurations provided to the first UE are unusable.

In some embodiments, sending the third indication to the base station includes: sending the third indication to the base station in response to the second UE being connected to the base station.

In some embodiments, the method further includes at least one of: determining that the first UE uses a second default configuration in response to the indication information indicating that configurations other than DRX configurations in the SL configurations are unusable, in which the second default configuration is a configuration in the SL configurations other than the DRX configurations determined by the first UE based on the communication protocol, a current configuration in the SL configurations other than the DRX configurations of the first UE, or a default configuration in the SL configurations other than the DRX configurations of the first UE; stopping a timer on the SL in response to the indication information indicating that configurations other than DRX configurations in the SL configurations are unusable; or sending a fourth indication to the base station in response to the indication information indicating that configurations other than DRX configurations in the SL configurations are unusable, in which the fourth indication is configured to indicate a failure of configurations other than DRX configurations of the SL configurations provided to the first UE.

In some embodiments, sending the fourth indication to the base station includes: sending the fourth indication to the base station in response to the second UE being connected to the base station.

In some embodiments, the method further includes: sending the SL configurations through a Radio Resource Control (RRC) reconfiguration SL message.

In some embodiments, a communication configuration apparatus applied to a first UE includes: a first sending module, configured to send indication information to the second UE through a sidelink (SL) in response to at least a part of SL configurations provided by a second UE being unusable, in which the indication information at least indicates: one or more sets of SL configurations not used by the first UE or one or more sets of SL configurations used by the first UE.

In some embodiments, the SL configurations include: first configurations, the first configurations including one or more sets of DRX configurations of the SL.

In some embodiments, the first sending module is further configured to: send a first indication to the second UE through the SL, the first indication being configured to indicate that the one or more sets of DRX configurations in the first configurations are unusable; or send a second indication to the second UE through the SL, the second indication being configured to indicate that the one or more sets of DRX configurations in the first configurations are usable.

In some embodiments, the SL configurations include: second configurations, the second configurations including configurations other than the DRX configurations of the SL.

In some embodiments, the second configuration includes at least one of: a data transmission configuration; a SL bearer configuration; or a SL configuration other than the DRX configurations.

In some embodiments, the first sending module is further configured to: send a first indication to the second UE through the SL, the first indication being configured to indicate that one or more sets of SL configurations in the second configurations are usable; or send a second indication to the second UE through the SL, the second indication being configured to indicate that one or more sets of SL configurations in the second configurations are unusable.

In some embodiments, the first indication includes: a first configuration request indication, in which the first configuration request indication is configured to indicate a request to the second UE for sending a new DRX configuration of the SL.

In some embodiments, the second indication includes: a second configuration request indication, in which the second configuration request indication is configured to indicate a request to the second UE for sending a new configuration other than the DRX configurations of the SL.

In some embodiments, the apparatus further includes: a first using module, configured to use a first default configuration in response to the first UE determining that DRX configurations in the SL configurations are unusable, in which the first default configuration is a DRX configuration determined by the first UE based on a communication protocol, a current DRX configuration of the first UE, or a default DRX configuration of the first UE.

In some embodiments, the apparatus further includes: a second using module, configured to use a second default configuration in response to the first UE determining that configurations in the SL configurations other than the DRX configuration are unusable, in which the second default configuration is a configuration in the SL configurations other than the DRX configurations determined by the first UE based on a communication protocol, a current configuration in the SL configurations other than the DRX configurations of the first UE, or a default configuration in the SL configurations other than the DRX configurations of the first UE.

In some embodiments, the SL configurations are sent by the second UE through a Radio Resource Control (RRC) reconfiguration SL message.

In some embodiments, a communication configuration apparatus applied to a second UE includes: a first receiving module, configured to receive indication information sent by a first UE through a sidelink (SL), in which the indication information at least indicates: one or more sets of SL configurations not used by the first UE or one or more sets of SL configurations used by the first UE.

In some embodiments, the SL configurations include: first configurations, the first configurations including one or more sets of DRX configurations of the SL.

In some embodiments, the first receiving module is further configured to: receive a first indication sent by the first UE through the SL, the first indication being configured to indicate that the one or more sets of DRX configurations in the first configurations are unusable; or receive a second indication sent by the first UE through the SL, the second indication being configured to indicate that the one or more sets of DRX configurations in the first configurations are usable.

In some embodiments, the SL configurations include: second configurations, the second configurations including configurations other than DRX configurations of the SL.

In some embodiments, the second configuration includes at least one of: a data transmission configuration; a SL bearer configuration; or a SL configuration other than the DRX configurations.

In some embodiments, the first receiving module is further configured to: receive a first indication sent by the first UE through the SL, the first indication being configured to indicate that one or more sets of SL configurations in the second configurations are usable; or receive a second indication sent by the first UE through the SL, the second indication being configured to indicate that one or more sets of SL configurations in the second configurations are unusable.

In some embodiments, the first indication includes: a first configuration request indication, in which the first configuration request indication is configured to indicate a request to the second UE for sending a new DRX configuration of the SL.

In some embodiments, the second indication includes: a second configuration request indication, in which the second configuration request indication is configured to indicate a request to the second UE for sending a new configuration other than the DRX configurations of the SL.

In some embodiments, the apparatus further includes at least one of: a first determining module, configured to determine that the first UE uses a first default configuration in response to the indication information indicating that DRX configurations in the SL configurations are unusable, in which the first fault configuration is: a DRX configuration determined by the first UE based on a communication protocol, a current DRX configuration of the first UE, or a default DRX configuration of the first UE; a first stopping module, configured to stop a timer on the SL in response to the indication information indicating that DRX configurations in the SL configurations are unusable; or a second sending module, configured to send a third indication to a base station in response to the indication information indicating that DRX configurations in the SL configurations are unusable, in which the third indication is configured to indicate that the DRX configurations in the SL configurations provided to the first UE are unusable.

In some embodiments, the second sending module is further configured to: send the third indication to the base station in response to the second UE being connected to the base station.

In some embodiments, the apparatus further includes: a second determining module, configured to determine that the first UE uses a second default configuration in response to the indication information indicating that configurations other than DRX configurations in the SL configurations are unusable, in which the second default configuration is a configuration in the SL configurations other than the DRX configurations determined by the first UE based on the communication protocol, a current configuration in the SL configurations other than the DRX configurations of the first UE, or a default configuration in the SL configurations other than the DRX configurations of the first UE; a second stopping module, configured to stop a timer on the SL in response to the indication information indicating that configurations other than DRX configurations in the SL configurations are unusable; or a third sending module, configured to send a fourth indication to the base station in response to the indication information indicating that configurations other than DRX configurations in the SL configurations are unusable, in which the fourth indication is configured to indicate a failure of configurations other than the DRX configurations of the SL configurations provided to the first UE.

In some embodiments, the third sending module is further configured to: send the fourth indication to the base station in response to the second UE being connected to the base station.

In some embodiments, the apparatus further includes: a fourth sending module, configured to send the SL configurations through a RRC reconfiguration SL message.

In some embodiments, a communication device includes: a processor; and a memory for storing instructions executable by the processor. When the executable instructions are executed by the processor, the processor is configured to perform the communication configuration methods performed by the first UE described above or to perform the communication configuration methods performed by the second UE described above.

In some embodiments, a computer storage medium has a computer-executable program stored thereon. When the program is executed by a processor, the communication configuration methods performed by the first UE described above or the communication configuration methods performed by the second UE described above are performed.

In embodiments of the disclosure, in response to at least a part of SL configurations provided by a second UE being unusable, the indication information is sent to the second UE through a SL, in which the indication information at least indicates: one or more sets of SL configurations not used by the first UE or one or more sets of SL configurations used by the first UE. The first UE will send the indication information for indicating that one or more sets of SL configurations are unusable to the second UE through the SL, so that the second UE may be informed of the one or more sets of unusable SL configurations in the provided SL configurations. Or, the first UE will send the indication information for indicating that one or more sets of SL configurations are usable to the second UE through the SL, so that the second UE may be informed of the usable SL configurations in the provided SL configurations. Compared to the related art in which the receiver UE does not inform the sender of the unusable SL configurations, since the first UE feeds back the indication information of the one or more sets of unusable SL configurations or the indication information of the one or more sets of usable SL configurations to the second UE, it is possible to reduce the time that the second UE takes to reconfigure all the SL configurations when the second UE does not know that the one or more sets of SL configurations that are unusable by the first UE, and it is also possible to reduce the waste of resources occupied by the second UE to reconfigure the one or more sets of SL configurations that are usable by the first UE when the second UE is not informed of the one or more sets of SL configurations that are usable by the first UE, thereby improving the SL configuration efficiency for the first UE, and improving the communication performance of the first UE.

Other implementations of the disclosure will be apparent to those skilled in the art from consideration of the specification and practice of the disclosure disclosed here. This disclosure is intended to cover any variations, usages, or adaptations of the disclosure following the general principles thereof and including such departures from the disclosure as come within known or customary practice in the art. It is intended that the specification and examples are considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A communication configuration method, performed by a first User Equipment (UE), comprising:
- determining that at least part of sidelink (SL) configurations configured by a second UE are not to be applied and sending indication information to the second UE through the SL, wherein the indication information indicates that at least part of the SL configurations is not to be applied by the first UE;
- wherein the indication information indicates that a Discontinuous Reception (DRX) configuration of the SL configurations is not to be applied by the first UE, and is further configured for at least one of:
  - the second UE determining that a default configuration is applied by the first UE, wherein the default configuration comprises at least one of: a DRX configuration determined based on a communication protocol, a current DRX configuration of the first UE, or a default DRX configuration of the first UE; or
  - the second UE stopping a timer on the SL; or
- the second UE informing a network device that the DRX configuration of the SL configurations configured by the second UE is not to be applied by the first UE.

2. The method of claim 1, wherein the SL configurations comprise at least one of:
- a first configuration, the first configuration comprising an SL DRX configuration; or
- a second configuration, the second configuration comprising an SL configuration other than the SL DRX configuration.

3. The method of claim 2, wherein sending the indication information to the second UE through the SL comprises at least one of:
- sending first indication information to the second UE through the SL, the first indication information being configured to indicate that an SL DRX configuration received from the second UE is not to be applied by the first UE; or
- sending second indication information to the second UE through the SL, the second indication information being configured to indicate that the SL configurations received from the second UE are not to be applied by the first UE.

4. The method of claim 2, wherein the second configuration comprises at least one of:
- a data transmission configuration;
- an SL bearer configuration; or
- an SL configuration other than a DRX configuration.

5. The method of claim 1, wherein the SL configurations are sent by the second UE through a Radio Resource Control (RRC) reconfiguration SL message.

6. A non-transitory computer-readable storage medium, having a computer executable program stored thereon, wherein when the executable program is executed by a processor, the processor is caused to perform the communication configuration method of claim 1.

7. The method according to claim 1, wherein sending the indication information to the second UE through the SL comprises at least one of:
- sending a radio resource control reconfiguration complete sidelink (RRCReconfigurationCompleteSidelink) message comprising SL DRX configuration reject information to the second UE, wherein the RRCReconfigurationCompleteSidelink message indicates that the first UE rejects an SL DRX configuration received from the second UE; or
- sending an RRC reconfiguration failure sidelink (RRCReconfigurationFailureSidelink) message to the second UE, wherein the RRCReconfigurationFailureSidelink message indicates that the SL configurations received from the second UE are not to be applied by the first UE.

8. The method of claim 7, wherein the indication information comprising the SL DRX configuration reject information.

9. The method of claim 1, further comprising:
- determining that a DRX configuration of the SL configurations is not to be applied by the first UE, and applying a default configuration, wherein the default configuration comprising at least one of: a DRX configuration determined based on a communication protocol, a current DRX configuration of the first UE, or a default DRX configuration of the first UE.

10. A communication configuration method, performed by a second user equipment (UE), comprising:
- sending SL configurations to a first UE; and
- receiving indication information sent by the first UE through a sidelink (SL), wherein the indication information indicates that at least part of the SL configurations is not to be applied by the first UE;
- wherein the indication information indicates that a Discontinuous Reception (DRX) configuration of the SL configurations is not to be applied by the first UE, and is further configured for at least one of:
- the second UE determining that a default configuration is applied by the first UE, wherein the default configuration comprises at least one of: a DRX configuration determined based on a communication protocol, a current DRX configuration of the first UE, or a default DRX configuration of the first UE;
- the second UE stopping a timer on the SL; or
- the second UE informing a network device that the DRX configuration of the SL configurations configured by the second UE is not to be applied by the first UE.

11. The method of claim 10, wherein the at least part of the SL configurations comprise at least one of: a first configuration, the first configuration comprising an SL DRX configuration; or
- a second configuration, the second configuration comprising an SL configuration other than the SL DRX configuration.

12. The method of claim 11, wherein receiving the indication information sent by the first UE through the SL comprises at least one of:

receiving first indication information sent by the first UE through the SL, the first indication information being configured to indicate that an SL DRX configuration received from the second UE is not to be applied by the first UE; or receiving second indication information sent by the first UE through the SL, the second indication information being configured to indicate that the SL configurations received from the second UE are not to be applied by the first UE.

13. The method of claim 10, further comprising:

sending the SL configurations through a Radio Resource Control (RRC) reconfiguration SL message.

14. A communication device, comprising:

a processor; and a memory for storing instructions executable by the processor;

wherein the processor is configured to perform the method of claim 10.

15. A non-transitory computer-readable medium, having a computer executable program stored thereon, wherein when the executable program is executed by a processor, the processor is caused to perform the communication configuration method of claim 10.

16. The method of claim 10, wherein receiving the indication information sent by the first UE through the SL comprises at least one of:

receiving radio resource control reconfiguration complete sidelink (RRCReconfigurationCompleteSidelink) message comprising SL DRX configuration reject information from the first UE, wherein the RRCReconfigurationCompleteSidelink message indicates that the first UE rejects an SL DRX configuration received from the second UE; or receiving an RRC reconfiguration failure sidelink (RRCReconfigurationFailureSidelink) message from the first UE, wherein the RRCReconfigurationFailureSidelink message indicates that the SL configurations received from the second UE are not to be applied by the first UE.

17. The method of claim 16, wherein the indication information comprising the SL DRX configuration reject information.

18. The method of claim 10, further comprising at least one of:

determining that a default configuration is applied by the first UE, wherein the default configuration comprises at least one of: a DRX configuration determined based on a communication protocol, a current DRX configuration of the first UE, or a default DRX configuration of the first UE;

stopping a timer on the SL; or informing a network device that the DRX configuration in the SL configurations configured by the second UE is not to be applied by the first UE, wherein the second UE is in a connection state with the network device.

19. A communication device, comprising:

a processor; and a memory for storing instructions executable by the processor;

wherein the processor is configured to:

determine that at least part of sidelink (SL) configurations configured by a second User Equipment (UE) not to be applied, and send indication information to the second UE through the SL, wherein the indication information indicates that at least part of the SL configurations is not to be applied by the communication device;

wherein the indication information indicates that a Discontinuous Reception (DRX) configuration of the SL configurations is not to be applied by the communication device, and is further configured for at least one of:

the second UE determining that a default configuration is applied by the communication device, wherein the default configuration comprises at least one of: a DRX configuration determined based on a communication protocol, a current DRX configuration of the communication device, or a default DRX configuration of the communication device; or the second UE stopping a timer on the SL; or the second UE informing a network device that the DRX configuration of the SL configurations configured by the second UE is not to be applied by the communication device.

* * * * *